US008111890B2

(12) United States Patent
Imasugi et al.

(10) Patent No.: US 8,111,890 B2
(45) Date of Patent: Feb. 7, 2012

(54) MEDICAL IMAGE GENERATING DEVICE, METHOD AND PROGRAM

(75) Inventors: Yusuke Imasugi, Tokyo (JP); Shogo Azemoto, Tokyo (JP); Masakatsu Hoashi, Tokyo (JP)

(73) Assignee: AZE Ltd., Tokyo (JP)

( * ) Notice: Subject to any disclaimer, the term of this patent is extended or adjusted under 35 U.S.C. 154(b) by 1043 days.

(21) Appl. No.: 12/010,948

(22) Filed: Jan. 31, 2008

(65) Prior Publication Data

US 2008/0181475 A1 Jul. 31, 2008

(30) Foreign Application Priority Data

Jan. 31, 2007 (JP) ................................. 2007-020911
Dec. 19, 2007 (JP) ................................. 2007-328079

(51) Int. Cl.
*G06K 9/00* (2006.01)
(52) U.S. Cl. ........................................................ 382/131
(58) Field of Classification Search .................. 382/128, 382/131, 132
See application file for complete search history.

(56) References Cited

U.S. PATENT DOCUMENTS 5,297,551 A * 3/1994 Margosian et al. ........... 600/410
2009/0208082 A1* 8/2009 Westerhoff et al. ........... 382/131

OTHER PUBLICATIONS

"MDCT and MRI of Cardovascular Diseases," published by lgaku Shoin Ltd., Sep. 15, 2005, pp. 382-385.
"Trade Secrets of Three-Dimensional Imaging and Processing Method for Medicine," published by Shujunsha Co., Ltd., Nov. 5, 2003.
Hoashi et al., "Study of the three-dimensional image display method varied signal value in coronary arteries CT," *Medical Imaging and Information Sciences*, vol. 24, No. 2, 2004, pp. 50-54.

* cited by examiner

*Primary Examiner* — Jurie Yun
(74) *Attorney, Agent, or Firm* — Oliff & Berridge, PLC

(57) ABSTRACT

An image-constituting element group corresponding to bone areas is selected from among a plurality of image-constituting elements that make up a three-dimensional image model, and CT values originally associated only with the selected image-constituting element group are replaced by values resulting from multiplying the original values by ¼. As a result, a distribution curve 34A denoting a frequency distribution of bone is shifted to a region of CT values that are lower than those of a distribution curve 33 denoting a frequency distribution of blood vessels. An observation image is then constructed by maximum intensity projection on the basis of three-dimensional image data after such signal value replacement.

10 Claims, 9 Drawing Sheets

MEDICAL IMAGE GENERATING DEVICE, METHOD AND PROGRAM

RELATED APPLICATIONS

This application claims the priorities of Japanese Patent Application No. 2007-20911 filed on Jan. 31, 2007, and No. 2007-328079 filed on Dec. 19, 2007, which are incorporated herein by reference.

BACKGROUND OF THE INVENTION

1. Field of the Invention

The present invention relates to an image generating technology for aiding image diagnosis, and more particularly to a medical image generating device, method and program, that can generate an observation image suitable for diagnosis aid based on three-dimensional image data representing a spatial distribution of predetermined signal values (CT values and signal intensity) obtained with a diagnostic imaging apparatus such as a CT (computed tomography) apparatus, an MRI (magnetic resonance imaging) apparatus, or the like.

2. Description of the Prior Art

Medical image composition methods currently used in the medical field normally involve constructing on a computer a three-dimensional image model of a body to be observed on the basis of tomographic image groups obtained with a diagnostic imaging apparatus, and constructing then an image projected on a two-dimensional plane without losing the shape information of the three-dimensional image model. Known such methods include, depending on the type of image to be constructed, maximum intensity projection (MIP), minimum intensity projection (MinIP), surface rendering (SR) and volume rendering (VR).

In VR, a three-dimensional image model of a body to be observed is constructed by using an aggregation of image-constituting elements, called voxels, with which there are associated respective signal values such as CT values obtained with a diagnostic imaging apparatus. When obtaining a VR image, predetermined attributes (referred to hereinafter as "display properties") required for imaging, such as color and degree of opaqueness, are given to each image-constituting element corresponding to each signal value (for example, see "MDCT and MRI of Cardiovascular Diseases" (Igaku Shoin)).

In VR display, appropriately setting the display properties allows grasping the three-dimensional structure of various sites, which is useful for roughly grasping the positional relationship between an affected site and bone or the surroundings of the affected site. In VR display, however, contrast information is likely to be missing in three-dimensional image data, which hampers visualization of low-contrast sites such as tapering blood vessels. Thus, it may become impossible to grasp the relationship between, for instance, an affected site and blood vessels linked therewith (blood vessels that supply nourishment to a tumor).

On the other hand, MIP is a method in which there are projected only those image-constituting elements that have the greatest signal values on the respective lines of sight set for the three-dimensional image model, and hence MIP is a method in which contrast information in the three-dimensional image data is reflected on a projection image, which allows visualizing even low-contrast blood vessels and the like, being thus advantageous for grasping a complete picture of the blood vessels.

In MIP display using contrast-enhanced CT images, in particular, blood vessels can be visualized down to the low-contrast portions where the vessels taper off, and thus the overall structure of the blood vessels can be grasped readily. Such MIP display is widely used, therefore, in wide areas such as the abdomen, thorax, lower limbs or the like.

However, when tissue such as bone, having higher signal values than blood vessels, is present in the area to be observed together with blood vessels, on the set line of sight, it is bone that becomes visualized, while the blood vessels fail to do so. For this reason there is carried out image processing in which portions corresponding to tissues such as bone or the like, having higher signal values than blood vessels, are extracted on the three-dimensional image model, and then the extracted portions are effaced through masking or the like (see, for instance, "Trade Secrets of Three-Dimensional Imaging and Processing Method for Medicine (Shujunsha)").

However, the spine and the ribs, among others, offer important clues for determining the position of tissue to be observed, such as blood vessels, tumors or the like, in the abdomen and/or the thorax of the body. Expunging thus the spine, ribs or the like from images is hence problematic as this makes it more difficult to grasp the positional relationship of the tissue to be observed.

SUMMARY OF THE INVENTION

In light of the above, it is an object of the present invention to provide a medical image generating device, method and program that allow observing distinctively the state of tissue to be observed down to low-contrast portions while grasping the positional relationship between the tissue to be observed and peripheral tissue thereof.

The medical image generating device according to the present invention is a medical image generating device for generating a predetermined observation image on the basis of three-dimensional image data in which predetermined signal values obtained with a diagnostic imaging apparatus are associated respectively with a plurality of image-constituting elements that make up a three-dimensional image model of a body to be observed, the device comprising:

selection means for selecting an image-constituting element group corresponding to a predetermined biological tissue, from among the plurality of image-constituting elements;

signal value adjusting means for replacing each signal value associated with the selected image-constituting element group with a converted signal value obtained by a predetermined conversion processing; and image constructing means for constructing the observation image by maximum intensity projection or minimum intensity projection on the basis of the three-dimensional image data after replacement of the signal values.

In such a medical image generating device there may be carried out, as the predetermined conversion processing, a processing of multiplying original values of the signal values by a predetermined numerical value, and/or a processing of adding a predetermined numerical value to original values of the signal values.

Also, the selection means may select an image-constituting element group corresponding to the predetermined biological tissue on the basis of a histogram of the predetermined signal values associated with the three-dimensional image data.

Also, the predetermined biological tissue may be peripheral tissue located in the periphery of an identification tissue to be observed, in which case the identification tissue may be blood vessels, and the peripheral tissue may be bone.

Further, the diagnostic imaging apparatus may be a CT apparatus and/or an MRI apparatus, and the signal values may be CT values and/or signal intensities.

The medical image generating method according to the present invention is a medical image generating method for generating a predetermined observation image on the basis of three-dimensional image data in which predetermined signal values obtained with a diagnostic imaging apparatus are associated with a plurality of image-constituting elements that make up a three-dimensional image model of a body to be observed, the method comprising the following steps in order:

selection processing for selecting an image-constituting element group corresponding to a predetermined biological tissue, from among the plurality of image-constituting elements;

signal value adjusting processing for replacing each signal value associated with the selected image-constituting element group with a converted signal value obtained by a predetermined conversion processing; and image constructing processing for constructing the observation image by maximum intensity projection or minimum intensity projection on the basis of the three-dimensional image data after replacement of the signal values.

Further, the medical image generating program according to the present invention is a medical image generating program for executing, in a computer, steps for constructing and displaying a predetermined observation image, on the basis of three-dimensional image data in which predetermined signal values obtained with a diagnostic imaging apparatus are associated with a plurality of image-constituting elements that make up a three-dimensional image model of a body to be observed, the program performing:

a selection step for selecting an image-constituting element group corresponding to a predetermined biological tissue, from among the plurality of image-constituting elements;

a signal value adjusting step for replacing each signal value associated with the selected image-constituting element group with a converted signal value obtained by a predetermined conversion processing; and an image constructing step for constructing the observation image by maximum intensity projection or minimum intensity projection on the basis of the three-dimensional image data after replacement of the signal values.

Other than taking as a converted signal value a numerical value calculated through a predetermined operation performed on the original values of the signal values, the above "predetermined conversion processing" includes also, for instance, storing beforehand, in a memory, predetermined numerical values as modified signal values, and replacing the stored modified signal values with original signal values.

DESCRIPTION OF THE PREFERRED EMBODIMENTS

Figure 1:
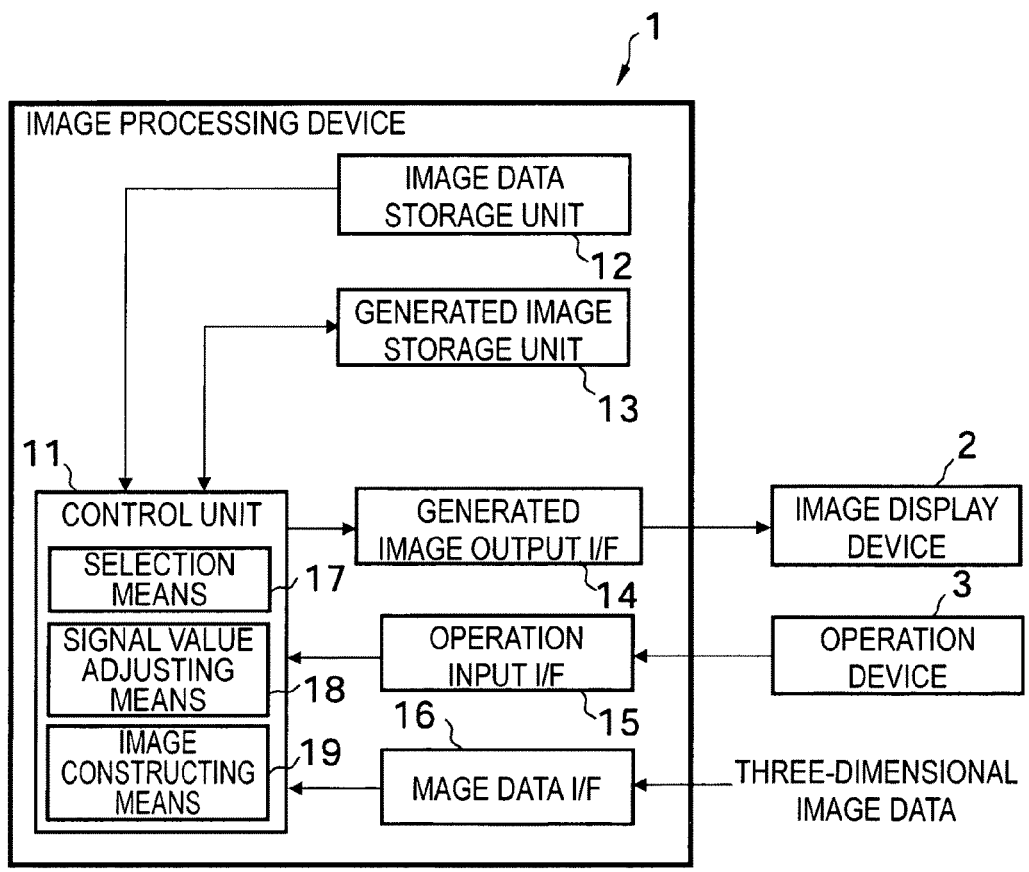
FIG. 1 is a block diagram of a medical image generating device according to the present invention.

Embodiments of the present invention will be described below in detail with reference to the accompanying drawings. FIG. 1 is a block-diagram illustrating the configuration of a medical image generating device according to an embodiment of the present invention.

The discrimination image generating device for a biological tissue shown in FIG. 1 generates and displays a predetermined observation image suitable for image diagnosis based on three-dimensional image data for a body to be observed (for instance, a human body) that are obtained with a diagnostic imaging apparatus such as a CT apparatus, MRI apparatus or the like. Such a device has an image processing device 1 comprising a computer or the like, an image display device 2 having a display screen comprising a liquid display panel or the like, and an operation device 3 comprising a mouse, a keyboard, or the like.

The image processing device 1 comprises a control unit 11 composed of a CPU that performs a variety of computations, a storage device such as a RAM or ROM, and a control program stored in the storage device, an image data storage unit 12 that stores three-dimensional image data on a body that is observed, such image data being obtained with a diagnostic imaging apparatus, and a generated image storage unit 13 that stores the image subjected to image processing. Further, the image processing device 1 comprises also a generated image output interface (I/F) 14 that outputs the image subjected to image processing to the image display device 2, an operation input interface (I/F) 15 that transmits a variety of operation inputs from the operation device 3 to the control unit 11, and an image data interface (I/F) 16 that transmits to the control unit 11 three-dimensional image data relating to the interior of a living body and inputted via communication means or a storage medium.

The three-dimensional image data are data of signal values (for example, CT values obtained with a CT device or signal intensities obtained with an MRI device) that are respectively associated with a plurality of image-constituting elements (for example, voxels) that make up a three-dimensional model of the body to be observed. The image processing device 1 is configured so as to be capable of generating various observation images (for instance, MIP images, MinIP images, VR images or the like) relating to the body to be observed based on such distribution data, and to be capable of displaying the observation images on the image display device 2.

In a storage device provided in the control unit 11 there is stored a medical image generating program according to an embodiment of the present invention for causing the various below-described processes to be executed in the image processing device 1. The control unit 11 for executing such a medical image generating program comprises, in the device of the present embodiment, selection means 17, signal value adjusting means 18, and image constructing means 19.

The selection means 17 selects, from among the above plural image-constituting elements, an image-constituting element group (aggregate of image-constituting elements; voxel group) corresponding to a predetermined biological tissue (for instance, an affected site such as a tumor or the like, bone, blood vessels, organs and the like). The signal value adjusting means 18 replaces the respective signal values associated with the selected image-constituting element group with converted signal values having been subjected to a predetermined conversion processing. On the basis of three-dimensional image data after such signal value replacement, the image constructing means 19 constructs an observation image by maximum intensity projection or minimum intensity projection.

Figure 2:
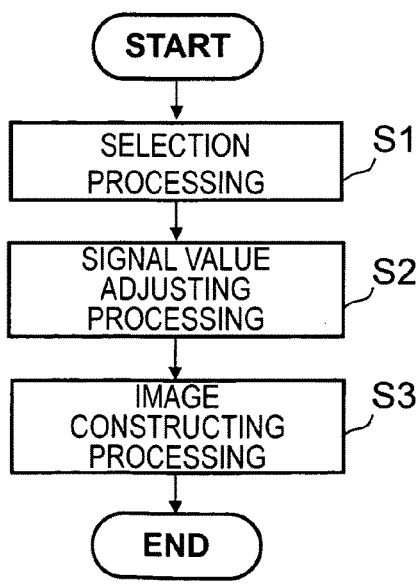
FIG. 2 is a flowchart illustrating the steps of a medical image generating method according to the present invention.
Figure 3A:
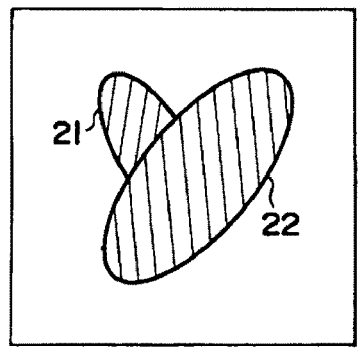
FIG. 3A is an MIP image before applying the present invention.
Figure 3B:
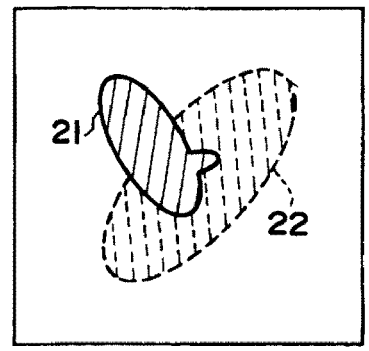
FIG. 3B is an MIP image after applying the present invention.
Figure 4A:
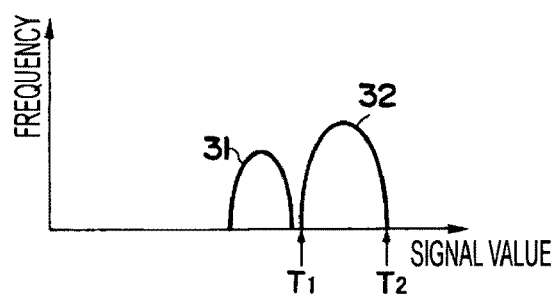
FIG. 4A is a histogram before applying the present invention.
Figure 4B:
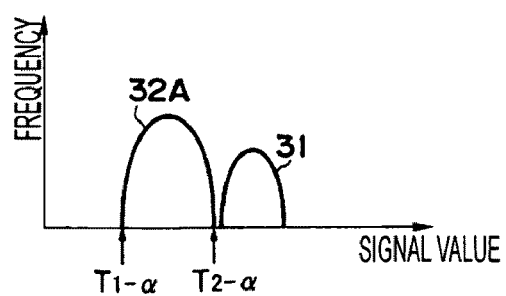
FIG. 4B is a histogram after applying the present invention.

The medical image generating method according to the present invention is explained next. FIG. 2 is a flowchart illustrating the steps of the medical image generating method according to an embodiment of the present invention. FIGS. 3 and 4 are diagrams for explaining the effect of the method according to the present embodiment. FIG. 3A illustrates schematically an MIP image built based on three-dimensional image data before applying the method of the present embodiment, while FIG. 3B illustrates schematically an MIP image constructed based on three-dimensional image data after applying the method of the present embodiment. Meanwhile, FIG. 4A illustrates schematically a signal value histogram based on three-dimensional image data before applying the method of the present embodiment, while FIG. 4B illustrates schematically a signal value histogram based on three-dimensional image data after applying the method of the present embodiment. The medical image generating method according to the present embodiment employs the medical image generating device illustrated in FIG. 1.

As illustrated in FIG. 3A, an MIP image before applying the method of the present embodiment is visualized as biological tissue 21 to be observed (hereinafter "identification tissue" for short), and other biological tissue 22 located in the periphery of the biological tissue 21 (hereinafter, "peripheral tissue" for short). The peripheral tissue 22, however, has higher signal values, and hence the peripheral tissue 22 may end up being visualized superposed on the set line of sight, thus precluding observing the identification tissue 21.

In the method of the present embodiment there is carried out firstly, selection processing (step S1 in FIG. 2). In the selection processing there is selected, from among plural image-constituting elements, an image-constituting element group corresponding to the peripheral tissue 22 (see FIG. 3A). In the method of the present embodiment, the selection processing is carried out by the selection means 17. The selection of the image-constituting element group can be carried out as follows, for instance on the basis of the histogram illustrated in FIG. 4A.

Specifically, there is designated, on the basis of the histogram illustrated in FIG. 4A, a numerical value range (lower limit $T_1$ to upper limit $T_2$) for the signal values corresponding to the peripheral tissue 22 in the MIP image of FIG. 3A. (In FIG. 4A, a distribution curve 31 denoting the frequency distribution of the signal values of the identification tissue 21 and a distribution curve 32 denoting the frequency distribution of the signal values of the peripheral tissue 22 are separated from each other, which allows designating easily numerical value ranges for these signal values). The image-constituting element group with which the signal values in the designated numerical value range are associated, is selected next from among the plural image-constituting elements, as a group corresponding to the peripheral tissue 22. An operator such as a doctor may designate the above numerical range.

A signal value adjusting processing is carried out next (step S2 in FIG. 2). In the signal value adjusting processing, each signal value associated with the selected image-constituting element group is replaced by a converted signal value obtained through a predetermined conversion processing. In the method of the present embodiment, the signal value adjusting processing is carried out by the signal value adjusting means 18. The conversion processing can be carried out as follows, on the basis of, for instance, the signal value frequency distribution illustrated in FIG. 4.

In the frequency distribution illustrated in FIG. 4A, specifically, there are calculated respective converted signal values (lower limit $T_1-\alpha$ to upper limit $T_2-\alpha$) by carrying out a computation in which a predetermined numerical value $-\alpha$ is added to an original value of each signal value of the numerical range (lower limit $T_1$ to upper limit $T_2$) designated as corresponding to the peripheral tissue 22, and then the original signal values are replaced with the calculated respective converted signal values. As illustrated in FIG. 4B, as the numerical value $-\alpha$ there is set a numerical value such that, through signal value replacement, the distribution curve 32, which denotes the signal value frequency distribution of the peripheral tissue 22, is shifted to a region where the signal values are smaller than those of the distribution curve 31 that denotes the signal value frequency distribution of the identification tissue 21.

An image constructing processing is carried out next (step S3 of FIG. 2). In the image constructing processing there is constructed an observation image by maximum intensity projection, based on three-dimensional image data after signal value replacement. In the method of the present embodiment, the image constructing processing is carried out by the image constructing means 19.

As a result of this image constructing processing there is constructed an MIP image such as the one illustrated in FIG. 3B. In the MIP image, the identification tissue 21, having now signal values relatively greater than those of the peripheral tissue 22 through signal value replacement, is visualized clearly, while the peripheral tissue 22 is visualized faintly enough so as to allow grasping the position of the identification tissue 21. An operator such as a doctor may set the above $-\alpha$ value. Herein the operator may also fine-tune the $-\alpha$ value while observing the MIP image constructed on the basis of the set $-\alpha$ value.

In the above embodiment, as illustrated in FIG. 4A, the distribution curve 31 of the signal values of the identification tissue 21, and the distribution curve 32 of the signal values of the peripheral tissue 22 are separated from each other on a histogram, and hence the above selection processing can be easily carried out on the basis of the histogram. In practice, however, the frequency distribution of the signal values of the identification tissue and the frequency distribution of the signal values of the peripheral tissue may overlap on the histogram.

In such cases it becomes necessary to select an image-constituting element group corresponding to the identification tissue or the peripheral tissue by using another selection method. As such a selection method there can be employed, for instance, the blood vessel extraction methods described in Japanese Unexamined Patent Publication No. 2004-283373 and Japanese Patent Application No. 2006-171447. There can also be employed conventional methods that involve extraction of specific tissues such as bone or the like, in the light of, for instance, the volume and relationship between image-constituting elements having mutually contiguous associated signal values on a three-dimensional image model.

Figure 5:
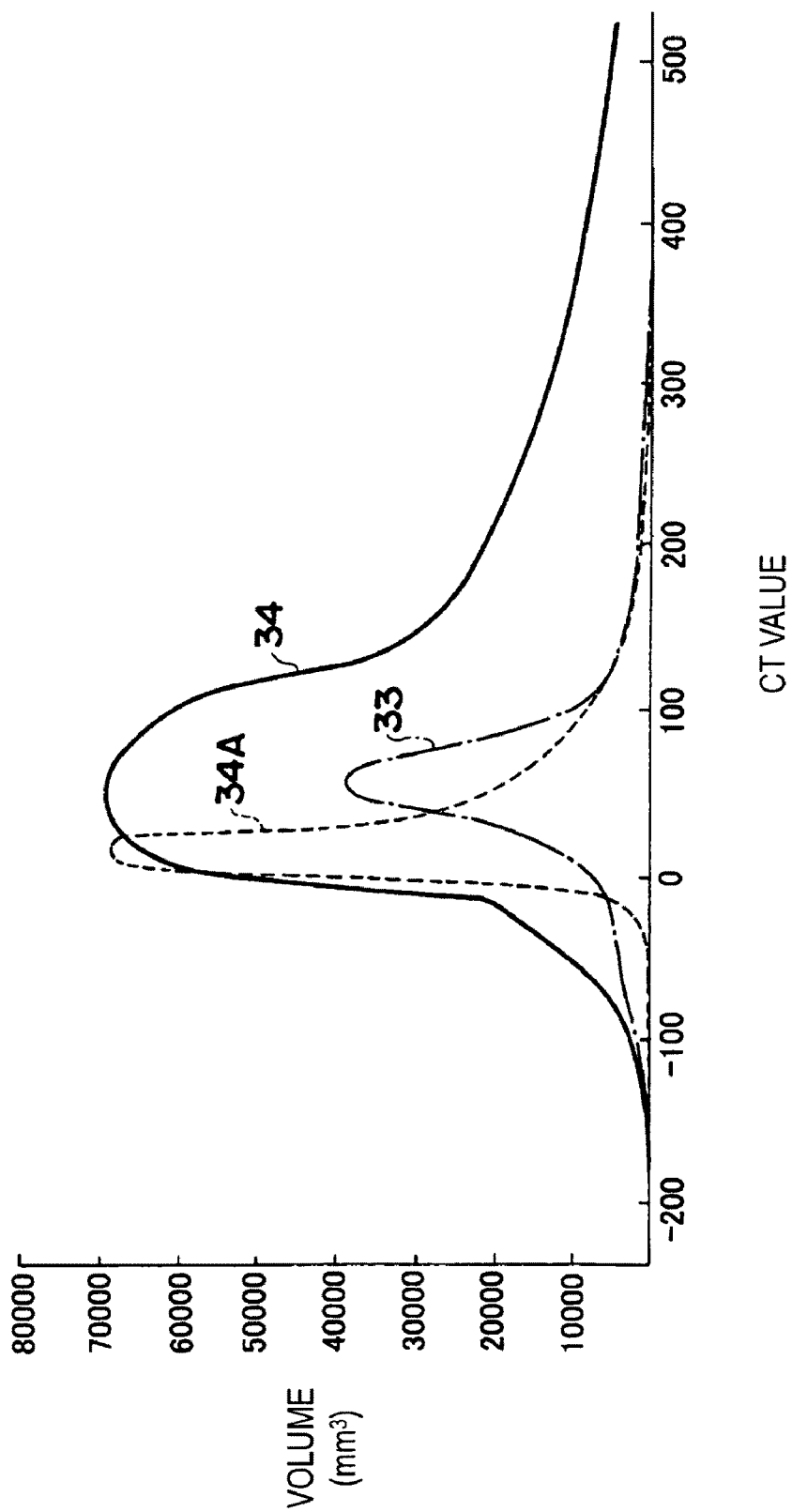
FIG. 5 is a diagram illustrating changes in a signal value histogram before and after applying the present invention.
Figure 6:
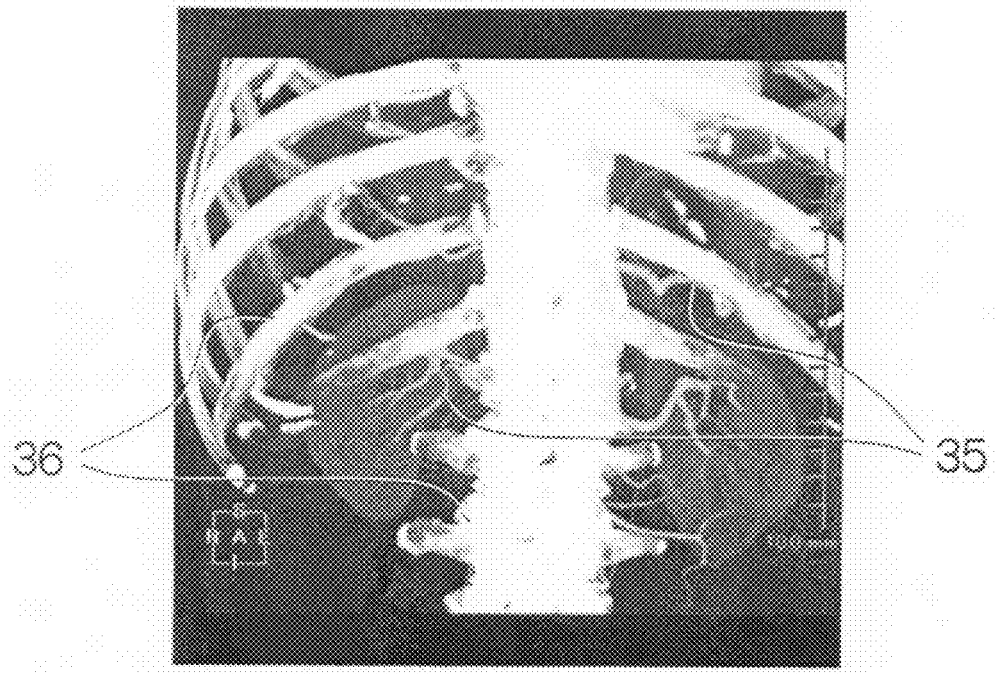
FIG. 6 is an MIP image before applying the present invention, corresponding to the histogram illustrated in FIG. 5.
Figure 7:
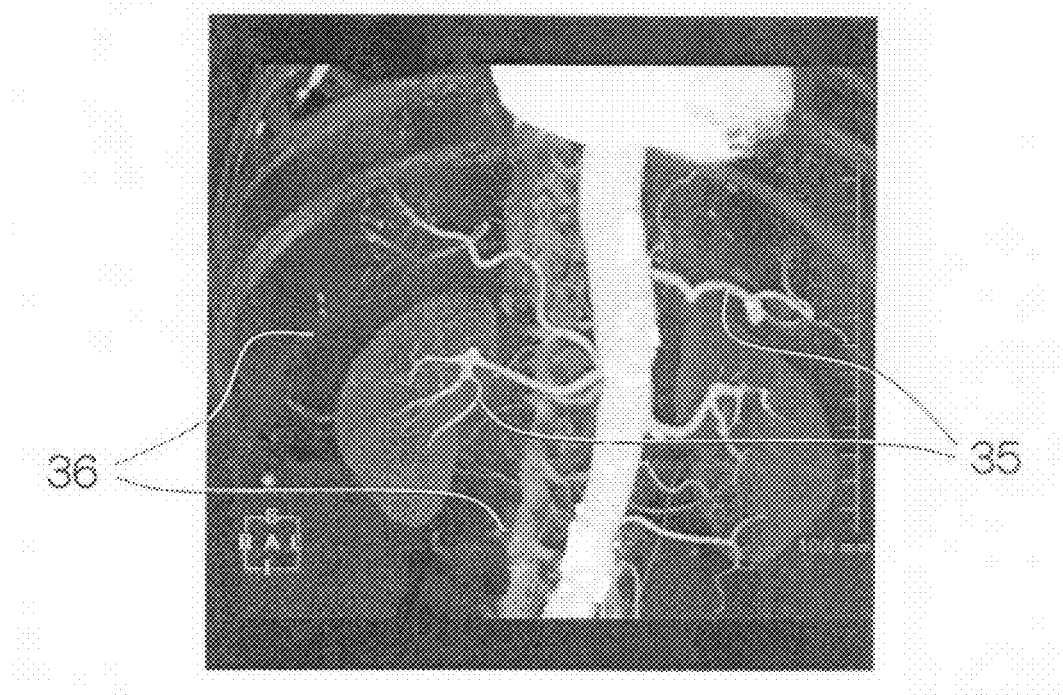
FIG. 7 is an MIP image after applying the present invention, corresponding to the histogram illustrated in FIG. 5.

An explanation follows next on an application example of the present invention when the frequency distribution of the signal values of identification tissue and the frequency distribution of the signal values of peripheral tissue overlap with each other on a histogram. FIG. 5 is a diagram illustrating the change in a signal value histogram before and after applying the present invention. FIG. 6 and FIG. 7 are MIP images of a human abdomen corresponding to the histogram illustrated in FIG. 5. FIG. 6 illustrates a state before applying the present invention, while FIG. 7 illustrates a state after applying the present invention. In FIG. 5, the horizontal axis represents CT values, as the signal values, while the vertical axis represents volume units (mm$^3$) in the body, as the frequency.

In the example illustrated in FIG. 5, a distribution curve 33 (dotted-dashed line) denoting the frequency distribution of blood vessels, as the identification tissue, overlaps completely with a distribution curve 34 (solid line) illustrating the frequency distribution of bone, as peripheral tissue. Moreover, bone areas have larger CT values throughout than blood vessel areas. As a result, bone 36 is visualized, while blood vessels 35 cannot be observed in the MIP image before applying the present invention, as illustrated in FIG. 6, at the overlapping portions of bone 36 and blood vessels 35 on the set line of sight.

Therefore there is selected an image-constituting element group, corresponding to bone areas, from among plural image-constituting elements that make up the three-dimensional image model, and then the signal values originally associated with the selected image-constituting element group alone are replaced by converted signal values obtained through a predetermined conversion processing. In the present example, the original values of the signal values are multiplied by a predetermined numerical value (¼), to calculate thereby the converted signal values. As illustrated in FIG. 5, a distribution curve 34A (broken line) denoting the frequency distribution of bone 36 is shifted, as a result, to a region where the CT values are smaller than those of the distribution curve 33 that denotes the frequency distribution of blood vessels 35.

A MIP image such as the one illustrated in FIG. 7 is thus formed through construction of an observation image, by maximum intensity projection, on the basis of three-dimensional image data after such signal value replacement. In the MIP image illustrated in FIG. 7, blood vessels 35, having now signal values relatively greater than those of bone 36 through signal value replacement, are visualized clearly down to the portions where the vessels taper off, while bone 36 is visualized faintly enough so as to allow making out the positional relationship of blood vessels 35 in the abdominal region.

Figure 8:
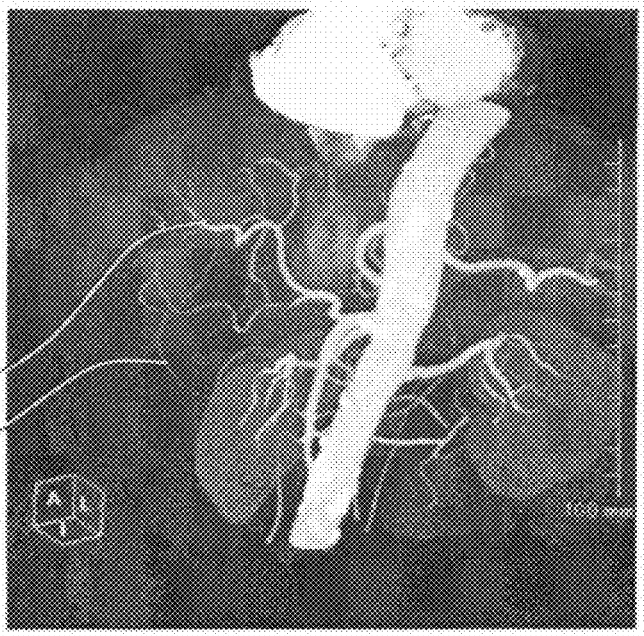
FIG. 8 is an MIP image of an abdominal region before applying the present invention.
Figure 9:
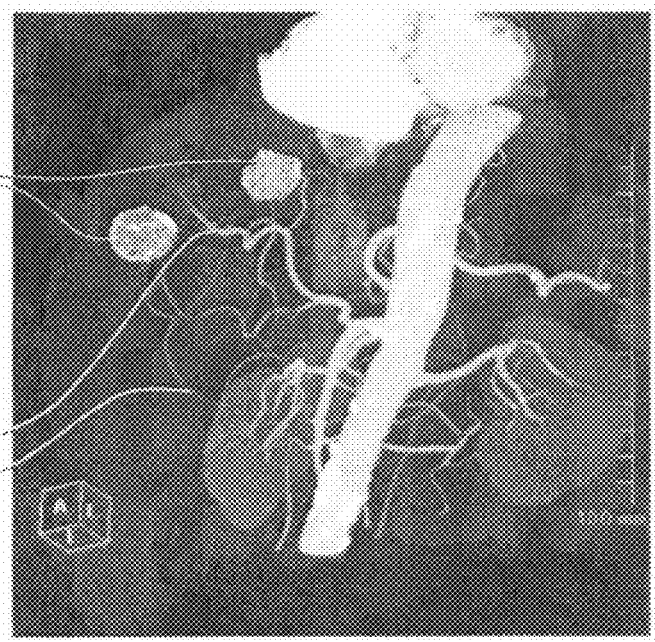
FIG. 9 is an MIP image of an abdominal region after applying the present invention.
Figure 10:
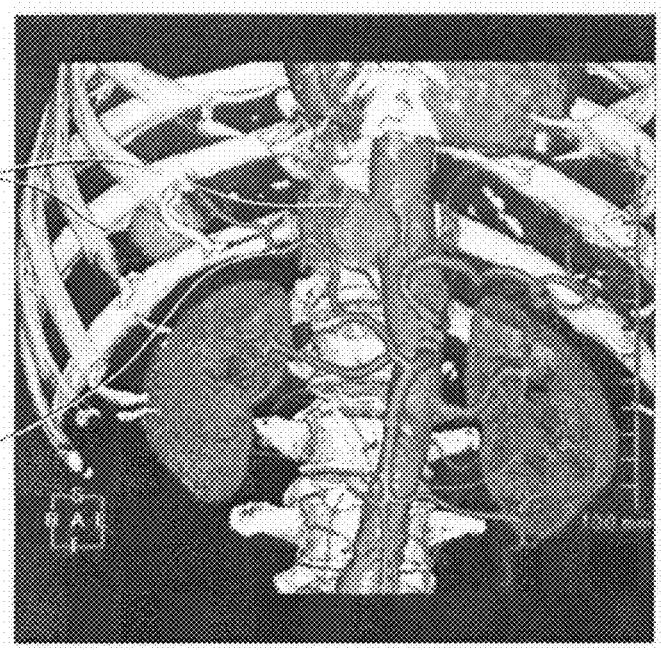
FIG. 10 is an observation image (comparative example) generated by volume rendering.

The present invention is not limited to cases where blood vessels are the identification tissue and bone is the peripheral tissue. FIGS. 8 through 10 illustrate image examples in which the identification tissue is an affected site (tumor) and blood vessels are the peripheral tissue. FIG. 8 is an MIP image before applying the present invention, while FIG. 9 is an MIP image after applying the present invention. FIG. 10 illustrates, as a comparative example, an observation image (VR image) generated through volume rendering. In FIGS. 8 and 9 bone areas have been effaced in accordance with conventional methods. The line of sight direction set in FIG. 10 is different from line of sight direction set in FIG. 8 and FIG. 9.

In the MIP image illustrated in FIG. 8, a tumor 40 (see FIG. 9), as the identification tissue, and blood vessels 37, as the peripheral tissue, overlap on the set line of sight. Since the signal values of blood vessels 37 are relatively greater, only blood vessels 37 are visualized at the overlap areas, so that the tumor 40 cannot be observed.

Therefore there is selected, using a conventional method, an image-constituting element group corresponding to tumor areas, from among plural image-constituting elements that make up the three-dimensional image model, and then the signal values originally associated with the selected image-constituting element group alone are replaced by converted signal values having relatively greater values than the signal values of the blood vessels.

A MIP image such as the one illustrated in FIG. 9 is thus formed through construction of an observation image, by maximum intensity projection, on the basis of three-dimensional image data after such signal value replacement. In the MIP image illustrated in FIG. 9, the tumor 40, having now signal values relatively greater than those of blood vessels 37 through signal value replacement, are visualized clearly, while blood vessels 37 that feed the tumor 40 are also visualized clearly down to the portions where the vessels taper off.

In the VR image illustrated in FIG. 10, on the other hand, visualization is three-dimensional, which allows grasping easily the positional relationship of the tumor 40. However the tapering portions of the blood vessels 37 that nourish the tumor 40 are not reflected due to missing contrast information and cannot hence be visualized.

Figure 11:
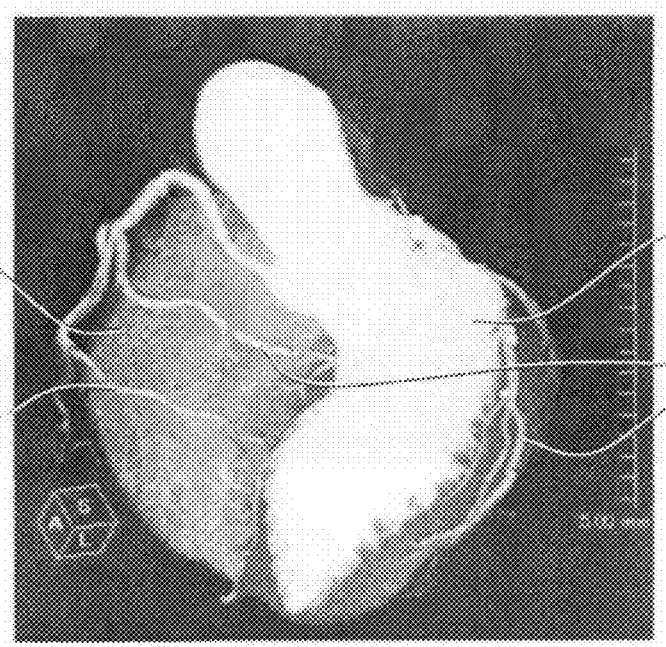
FIG. 11 is an MIP image of a region surrounding the heart before applying the present invention.
Figure 12:
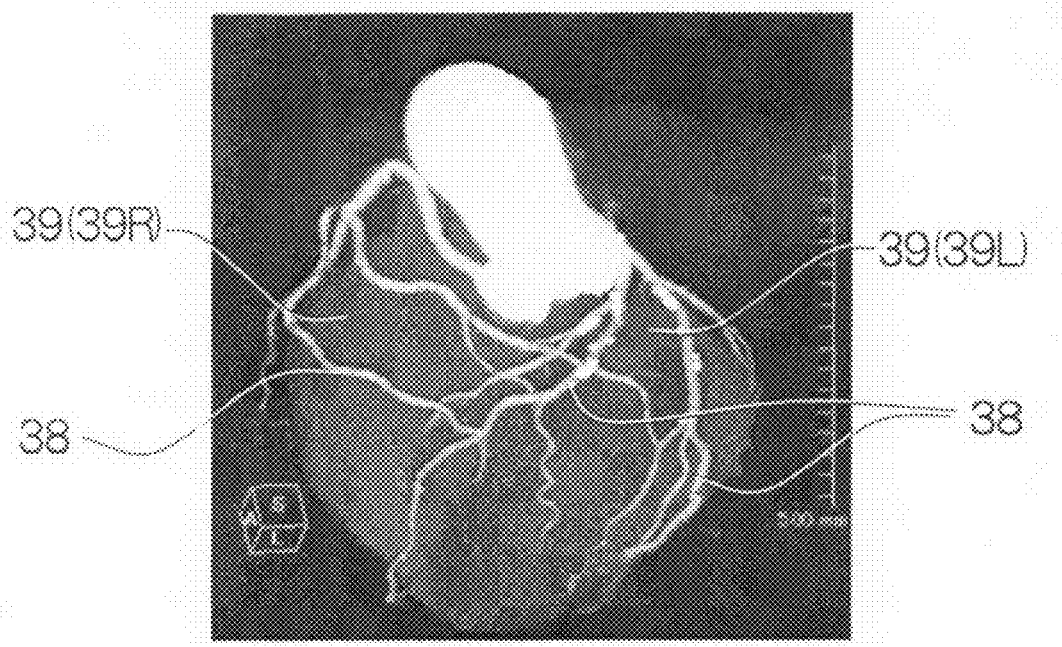
FIG. 12 is an MIP image of a region surrounding the heart after applying the present invention.
Figure 13:
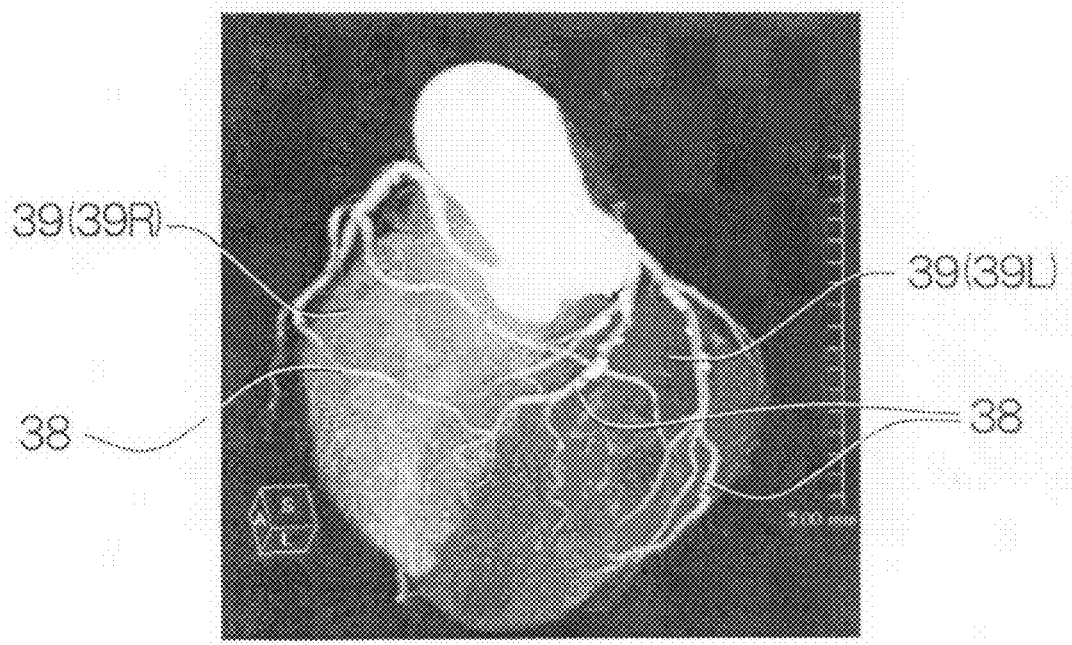
FIG. 13 is an MIP image (comparative example) in which a left ventricle portion has been removed in accordance with a conventional method.

FIGS. 11 to 13 illustrate image examples in which the identification tissue is coronary arteries of the heart and the peripheral tissue is the heart (myocardium). FIG. 11 is an MIP image before applying the present invention, while FIG. 12 is an MIP image after applying the present invention. FIG. 13 illustrates, as a comparative example, an MIP image in which the left ventricle portion has been effaced in accordance with a conventional method.

In the MIP image illustrated in FIG. 11, coronary arteries 38, as the identification tissue, and myocardium 39, as the peripheral tissue, overlap on the set line of sight. Since the signal values of myocardium 39 are relatively greater, the coronary arteries 38 are visualized indistinctly at the overlapping areas, and cannot be observed in detail.

Therefore, there is extracted an image-constituting element group, corresponding to the coronary arteries 38, from among plural image-constituting elements that make up the three-dimensional image model (the above blood vessel extraction method can be used herein), to select thereby a residual image-constituting element group not corresponding to the coronary arteries 38. Then, the signal values originally associated with the selected residual image-constituting element group alone are replaced by converted signal values having relatively smaller values than the signal values of the coronary arteries 38.

A MIP image such as the one illustrated in FIG. 12 is thus formed through construction of an observation image, by maximum intensity projection, on the basis of three-dimensional image data after such signal value replacement. In the MIP image illustrated in FIG. 12, the coronary arteries 38, having now signal values relatively greater than those of other tissue (including myocardium 39), through signal value replacement, are visualized clearly up to the portions where the arteries vanish, while myocardium 39 is visualized faintly enough so as to allow making out the positional relationship of the coronary arteries 38.

In the MIP image illustrated in FIG. 13, meanwhile, the portion of the left ventricle 39L (portion to the right in the figure) is effaced in accordance with the above conventional method, and hence the coronary arteries 38 are visualized with some sharpness on the side of the left ventricle 39L. The portion of the left ventricle 39L can be effaced using a conventional method because the myocardial tissue that makes up the left ventricle 39L is considerably thick, and the signal values thereof exhibit fairly greater values than those of the coronary arteries 38. Hence, the area of the left ventricle 39L can be specified easily in image data. However, the myocardial tissue that makes up the right ventricle 39R is thinner, and the signal values thereof exhibit values close to those of the coronary arteries 38. Accordingly, a conventional method is hard to employ for the side of the right ventricle 39R, and the coronary arteries 38 cannot be visualized distinctly on the side of the right ventricle 39R.

Figure 14:
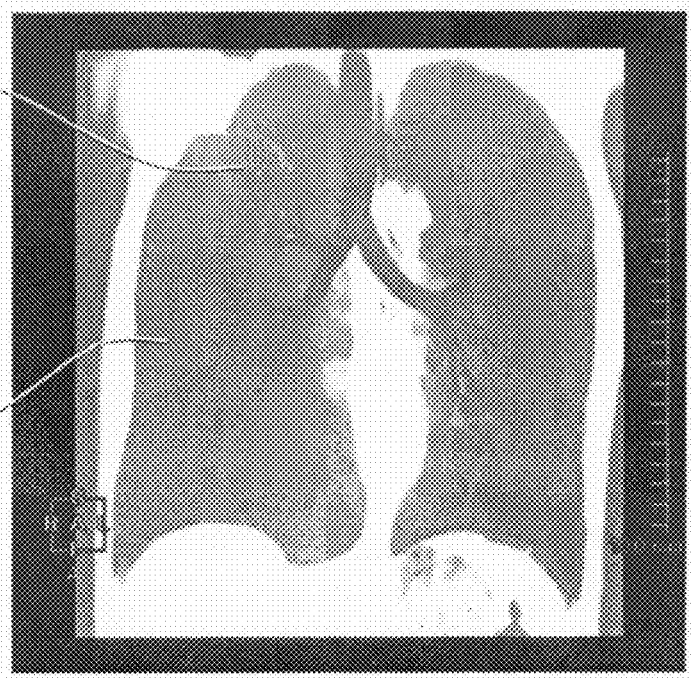
FIG. 14 is an MinIP image of a region around the lungs before applying the present invention.
Figure 15:
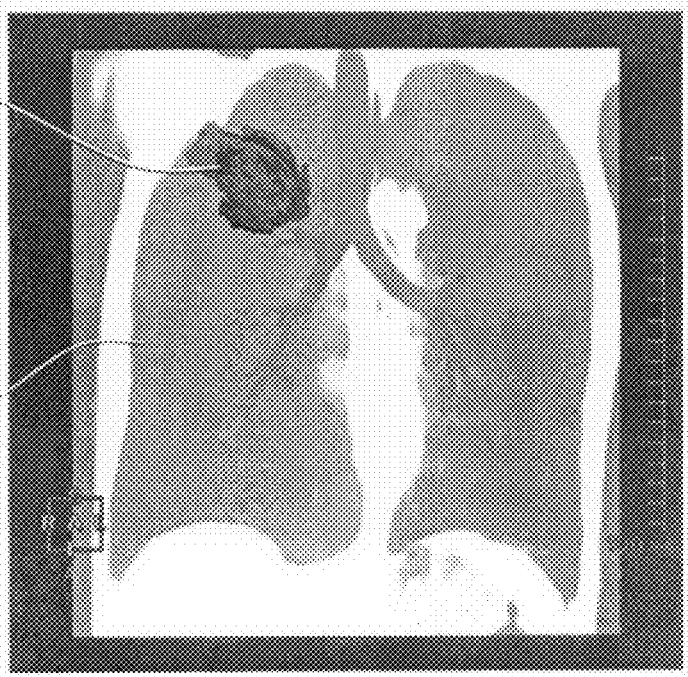
FIG. 15 is an MinIP image of a region around the lungs after applying the present invention.

The present invention is not limited to generating an MIP image, as an observation image, by maximum intensity projection, and can be employed as well in the generation of an MinIP image, as an observation image, by minimum intensity projection. FIGS. 14 and 15 illustrate MinIP image examples of an affected site (tumor) in the thorax, as the identification tissue, and lung tissue, as the peripheral tissue. FIG. 14 is an MinIP image before applying the present invention, while FIG. 15 is an MinIP image after applying the present invention.

In the MinIP image illustrated in FIG. 14, a tumor 41, as the identification tissue, and lung tissue 42, as the peripheral tissue, overlap on the set line of sight. Since both tissues exhibit substantially identical signal values, the tumor 41 and lung tissue 42 cannot be distinguished and observed clearly in the overlap portion.

Therefore there is selected, in accordance with a conventional method, an image-constituting element group, corresponding to the area of the tumor 41, from among plural image-constituting elements that make up a three-dimensional image model, and then the signal values originally associated with the selected image-constituting element group alone are replaced by converted signal values having relatively smaller values than the signal values of lung tissue 42.

An MinIP image such as the one illustrated in FIG. 15 is thus formed through construction of an observation image, by minimum intensity projection, on the basis of three-dimensional image data after such signal value replacement. In the MinIP image illustrated in FIG. 15, the tumor 41, having now signal values relatively smaller than those of lung tissue 42, through signal value replacement, is visualized clearly, while lung tissue 42 is visualized faintly enough so as to allow making out the positional relationship of the tumor 41 in the thoracic region.

Figure 16:
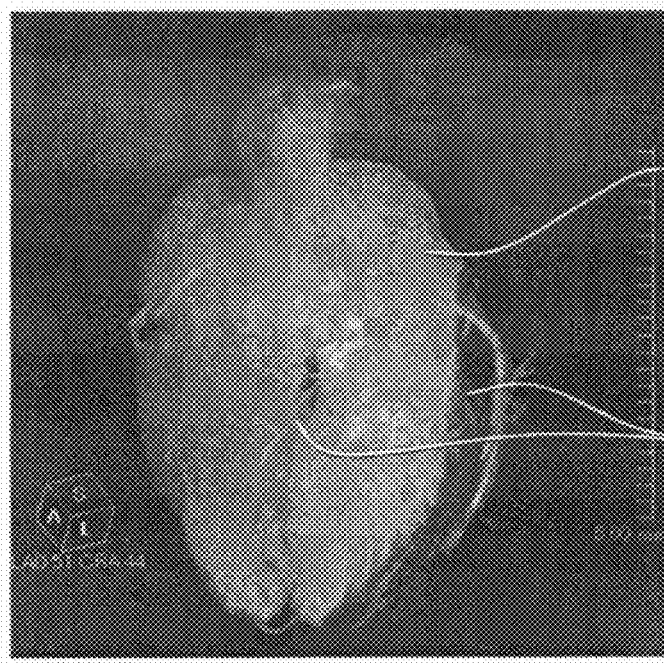
FIG. 16 is an MIP image of a region surrounding the heart before applying the present invention, based on an MRI image.
Figure 17:
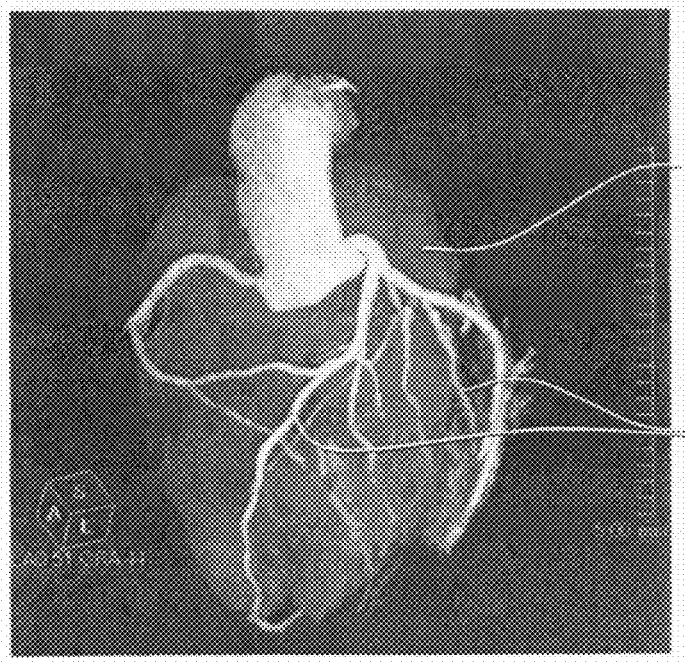
FIG. 17 is an MIP image of a region surrounding the heart after applying the present invention, based on an MRI image.

The present invention is not limited to generation of an observation image on the basis of image data obtained with a CT apparatus, and can be employed as well in the generation of an observation image based on image data obtained with an MRI apparatus. FIGS. 16 and 17 illustrate examples of MIP images generated (coronary arteries of the heart as the identification tissue and the heart (myocardium) as the peripheral tissue), as observation images, by maximum intensity projection based on image data obtained with an MRI apparatus. FIG. 16 is an MIP image before applying the present invention, while FIG. 17 is an MIP image after applying the present invention.

In the MIP image illustrated in FIG. 16, coronary arteries 43, as the identification tissue, and myocardium 44, as the peripheral tissue, overlap on the set line of sight. Since the signal values of myocardium 44 are relatively greater, the coronary arteries 43 are visualized indistinctly at the overlapping areas, and cannot be observed in detail.

Therefore, there is extracted an image-constituting element group, corresponding to the coronary arteries 43, from among plural image-constituting elements that make up the three-dimensional image model obtained based on image data from an MRI apparatus (the above blood vessel extraction method can be used herein), to select thereby a residual image-constituting element group not corresponding to the coronary arteries 43. Then, the signal values (signal intensity values) originally associated with the selected residual image-constituting element group alone are replaced by converted signal values having relatively smaller values than the signal values of the coronary arteries 43.

A MIP image such as the one illustrated in FIG. 17 is thus formed through construction of an observation image, by maximum intensity projection, on the basis of three-dimensional image data after such signal value replacement. In the MIP image illustrated in FIG. 17, the coronary arteries 43, having now signal values relatively greater than those of other tissue (including myocardium 44), through signal value replacement, are visualized clearly up to the portions where the arteries taper off, while myocardium 44 is visualized faintly enough so as to allow making out the positional relationship of the coronary arteries 43.

The present invention is not limited to the embodiments explained thus far, which can be modified in various ways.

In the above-described embodiments, observation images are generated for the abdomen or thorax, but the present invention can also be similarly employed for generating observation images at various sites such as the head, the lower limbs and the like.

In the explanation of the embodiments, also, there is used image data obtained mainly with a CT apparatus and an MRI apparatus, but the present invention can be employed also when using image data obtained with other diagnostic imaging apparatuses.

In the present invention, thus, there is selected an image-constituting element group, corresponding to a predetermined biological tissue, such as bone, a tumor or the like, from among plural image-constituting elements that make up a three-dimensional image model of a body to be observed, each signal value associated with the image-constituting element group is replaced by a signal value after conversion, such that an observation image is constructed, by maximum intensity projection or minimum intensity projection, on the basis of three-dimensional image data after such replacement. The invention allows, as a result, creating an observation image that enables observing clearly the state of tissue to be observed down to low-contrast portions, while grasping the positional relationship between the tissue to be observed and peripheral tissue thereof.

When, for instance, contrast-enhanced blood vessels are the tissue to be observed and bone is the peripheral tissue, bone, which has high signal values, hampers the visualization of the contrast-enhanced blood vessels in observation images obtained by conventional maximum intensity projection. In the present invention, on the other hand, each signal value associated with the image-constituting element group corresponding to bone is replaced by a signal value that is lower than the signal value range of contrast-enhanced blood vessels, but within a range that allows image display. An observation image can hence be generated through maximum intensity projection as a result of which a complete image of the blood vessels can be visualized clearly, down to the portions where the vessels taper off, while grasping the positional relationship between the blood vessels and bone.

What is claimed is:

1. A medical image generating device for generating an observation image, which is a medical image generating device for generating a predetermined observation image on the basis of three-dimensional image data in which predetermined signal values obtained with a diagnostic imaging apparatus are associated respectively with a plurality of image-constituting elements that make up a three-dimensional image model of a body to be observed,
the device comprising:
selection means for selecting an image-constituting element group corresponding to a predetermined biological tissue, from among the plurality of image-constituting elements;
signal value adjusting means for replacing each signal value associated with the selected image-constituting element group with a converted signal value obtained by a predetermined conversion processing; and
image constructing means for constructing the observation image by maximum intensity projection or minimum intensity projection on the basis of the three-dimensional image data after replacement of the signal values.

2. The medical image generating device according to claim 1, wherein the predetermined conversion processing comprises multiplying original values of the signal values by a predetermined numerical value.

3. The medical image generating device according to claim 1, wherein the predetermined conversion processing comprises adding a predetermined numerical value to original values of the signal values.

4. The medical image generating device according to claim 1, wherein the selection means selects an image-constituting element group corresponding to the predetermined biological tissue on the basis of a histogram of the predetermined signal values associated with the three-dimensional image data.

5. The medical image generating device according to claim 1, wherein the predetermined biological tissue is peripheral tissue located in the periphery of an identification tissue to be observed.

6. The medical image generating device according to claim 5, wherein the identification tissue is a blood vessel, and the peripheral tissue is bone.

7. The medical image generating device according to claim 1, wherein the diagnostic imaging apparatus is a CT apparatus, and the signal values are CT values.

8. The medical image generating device according to claim 1, wherein the diagnostic imaging apparatus is an MRI apparatus, and the signal values are signal intensities.

9. A medical image generating method for generating an observation image, which is a method for generating a predetermined observation image on the basis of three-dimensional image data in which predetermined signal values obtained with a diagnostic imaging apparatus are associated with a plurality of image-constituting elements that make up a three-dimensional image model of a body to be observed,
the method comprising the following steps in order:
selection processing for selecting an image-constituting element group corresponding to a predetermined biological tissue, from among the plurality of image-constituting elements;
signal value adjusting processing for replacing each signal value associated with the selected image-constituting element group with a converted signal value obtained by a predetermined conversion processing; and
image constructing processing for constructing the observation image by maximum intensity projection or minimum intensity projection on the basis of the three-dimensional image data after replacement of the signal values.

10. A non-transitory computer-readable medium storing a medical image generating program for generating an observation image, which is a program for executing, in a computer, steps for constructing and displaying a predetermined observation image on the basis of three-dimensional image data in which predetermined signal values obtained with a diagnostic imaging apparatus are associated with a plurality of image-constituting elements that make up a three-dimensional image model of a body to be observed,
the program performing:
a selection step for selecting an image-constituting element group corresponding to a predetermined biological tissue, from among the plurality of image-constituting elements;
a signal value adjusting step for replacing each signal value associated with the selected image-constituting element group with a converted signal value obtained by a predetermined conversion processing; and
an image constructing step for constructing the observation image by maximum intensity projection or minimum intensity projection on the basis of the three-dimensional image data after replacement of the signal values.

* * * * *